July 18, 1950 — L. N. JARRY — 2,515,348

SUPPORT

Filed June 3, 1946 — 2 Sheets-Sheet 1

Inventor:
Louis N. Jarry
By Wallace and Cannon
Attorneys

July 18, 1950 L. N. JARRY 2,515,348
SUPPORT
Filed June 3, 1946 2 Sheets-Sheet 2
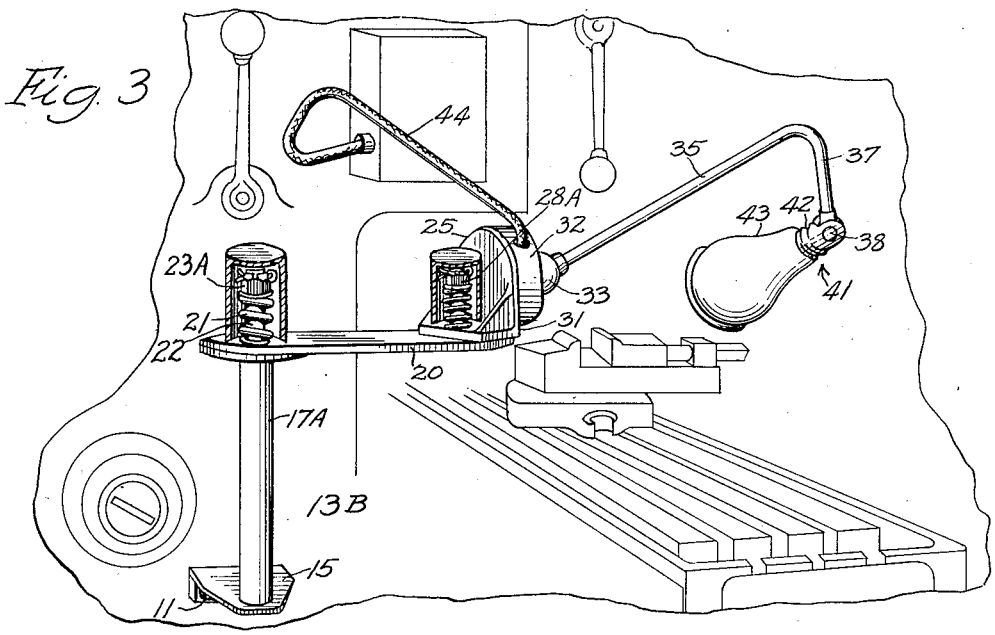
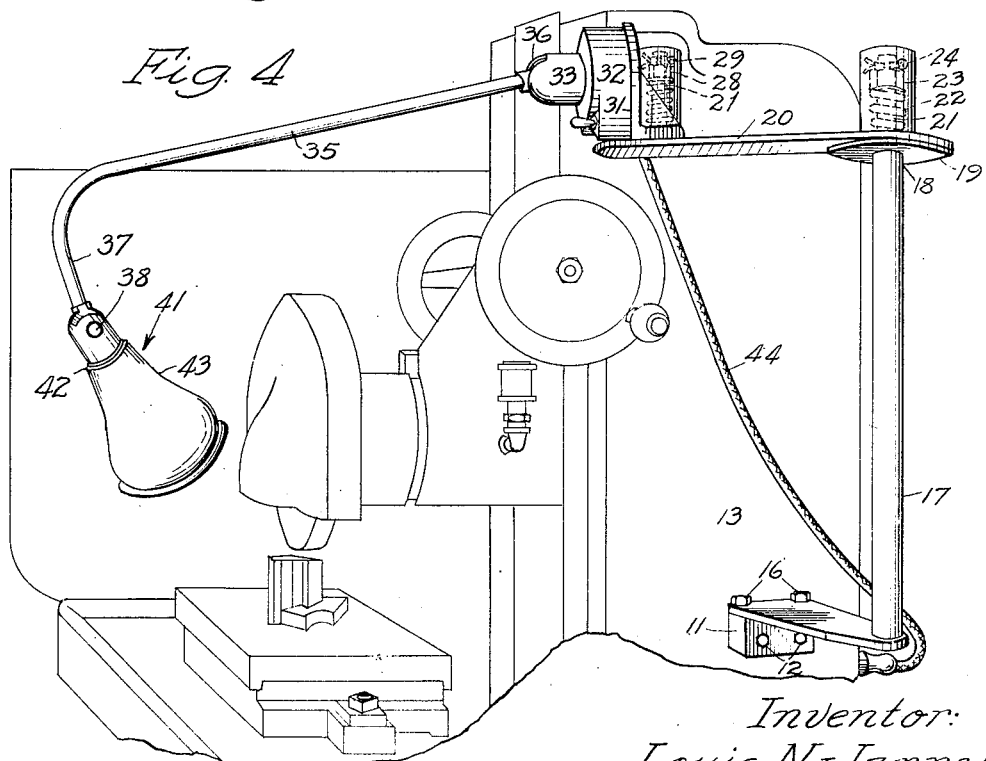
Inventor:
Louis N. Jarry
By Wallace and Cannon
Attorneys Patented July 18, 1950

2,515,348

UNITED STATES PATENT OFFICE 2,515,348

SUPPORT

Louis N. Jarry, East Cleveland, Ohio; Odna C. Jarry, sole heir, by order of the court Application June 3, 1946, Serial No. 674,125

1 Claim. (Cl. 248—274)

This invention pertains to a support and particularly to an adjustable support for illuminating devices such as electric lamps and the like. The invention pertains more particularly to a universally adjustable lamp supporting structure which is suitable for mounting upon various types of bases such as assorted kinds of machine tools and the like.

In machine shops where space is frequently at a premium it is essential that good illumination be provided in order that efficient production may be obtained from each machine operator. In the past many machine tools have been provided with various kinds of special lighting fixtures designed to serve the particular needs of such tools. In other cases illuminating means have been supported on various types of adjustable supports such as those adapted for longitudinal extension, for example, lazy tongs and analogous structures and those which are made adjustable by various angles and various elevations. Some of the latter have been adaptable to various types of machines but in general the special fixtures have lacked versatility and the adjustable type illuminating devices have not been as widely adaptable as is desirable nor have they been entirely satisfactory in operation.

Illuminating apparatus of the character referred to above have frequently lacked the essential characteristics of retaining positions to which they are adjusted or else they have involved certain difficulties in adjustment. The requirements for illumination in connection with the numerous and varied types of machine tools employed in modern industry make it essential that illuminating devices be useable in a wide variety of positions, that they be applicable to a wide variety of machinery, and that they be quickly and easily adjustable and capable of retaining adjusted positions when once adjusted for the desired illumination.

Accordingly it is an object of the present invention to combine features of angular, elevational and lateral adjustment in a compact and simple structure and in a novel manner to overcome various objections enumerated above.

Another object of my invention is to mount an illuminating device for universal adjustment by means which are firm and rigid and capable of retaining adjusted positions despite vibration of bases or supports to which they may be attached.

A further object is to mount an illuminating device on a support which is capable of being firmly attached to a variety of bases and structures and which is capable of wide horizontal, vertical and angular adjustments to provide illumination at many different points from a single base.

A still further object is to utilize spring elements to set up appropriate friction between adjustable parts of a lamp supporting structure so that such parts will retain adjusted positions even though they are subjected to vibration.

Still another object is to accomplish all the foregoing in a novel and useful manner employing simple and standard elements which can be readily assembled and which will occupy a minimum of space.

Other and further objects of the present invention will be apparent from the following description and claims and are illustrated in the accompanying drawings which, by way of illustration, show preferred embodiments and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings,

Fig. 3 is a perspective view of another slightly modified form attached to still another type of machine; and Fig. 4 is a perspective view of the lamp support shown in Fig. 1 adjusted to another position with respect to the machine on which it is mounted.

Figure 1:
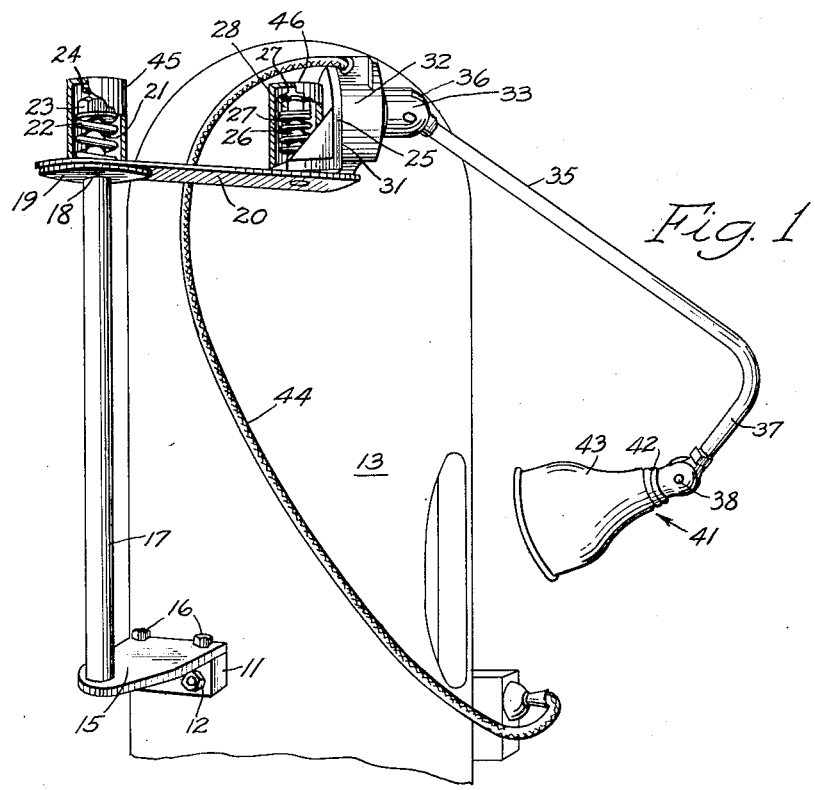
Fig. 1 is a perspective view of one form of a lamp supporting structure showing such structure attached to a lamp base.

Referring first to Fig. 1, one form of the device which comprises my invention includes a base block or supporting member 11 which is made of suitable material such as steel or iron and is adapted to be firmly secured by suitable means such as bolts 12 to a base or framework 13 of any suitable character, that in Fig. 1 being the frame of a grinding machine.

A substantially horizontal plate 15 is secured to the block 11 as by bolts 16 or it may be made integral with the block 11 or welded thereto if desired. The plate 15 carries a post or column 17 which extends substantially in a vertical direction and which may be threaded into the plate 15 or welded thereto or otherwise secured in an appropriate manner. The column or shaft 17 may be a solid shaft of suitable material, preferably metal, or it may be tubular, the latter being preferred for most installations since weight is thereby reduced.

The column or post 17 has an upper end portion of reduced diameter thereby affording a shoulder 18 on which a washer or disc 19 may be supported. This disc or washer may be free or if desired it may be secured in any desired manner to the member 17.

A flat plate or bar 20 of substantial width is mounted on the reduced portion 21 which projects as a stud from the column 17 to provide a horizontally extending arm which can be swung about the stud 21 to various angular positions.

In order to provide substantial friction between the plate 20 and the supporting disc or washer 19 so that the plate 20 will retain any adjusted position even though the column 17 is subjected to vibration, a strong coil spring 22 is preferably mounted surrounding the stud 21, and a nut 23 is threaded onto such stud to compress spring 21. By this means considerable friction may be established between the elements 19 and 20 and the amount of friction may be varied as desired by suitable adjustment of the nut 23. A cotter pin 24 is preferably provided to prevent loosening of the nut 23 from an adjusted position and if desired the nut 23 may be of the castellated type as shown for example in Fig. 3 at 23A.

At its outer or free end the plate or bar 20 supports an angular bracket 25 which is secured thereto as by a bolt or stud 26 for pivotal movement in a substantially horizontal plane. A spring 27 is preferably provided surrounding the stud or bolt 26 and compressed by a nut 28 to set up friction between the bracket 25 and the bar 20, this construction being similar to the arrangement of spring 22. As with the nut 23, the nut 28 may be secured by a suitable cotter pin 29 and may be of the castellated type if desired as shown at 28A in Fig. 3.

The bracket 25 preferably has a substantially vertical flat surface 31 to which the base 32 of an adjustable lamp support may be secured in any suitable manner, for example by screws or bolts, not shown. This base includes necessary electrical connections and mounts a swivel member 33 which can be rotated in a vertical plane to any desired position without interrupting the electric circuit or without injury to electrical conductors. This construction is well known in the art and needs no special description. The lamp base member 32 is provided with a suitable switch of any desired type as indicated at 34.

The swivel member 33 preferably carries a lamp supporting arm 35 which is pivotally supported in the swivel as indicated at 36. By this means a lamp supported by the arm 35 may be adjusted vertically, horizontally or angularly to various positions.

As shown in the drawings the arm 35 is preferably bent to afford an angular portion 37 which may extend substantially at right angles to the longer part of the arm 35 and which terminates in a hinged connection 38 with an illuminating fixture such as an electric lamp 41. The lamp 41 may be of any desired type and as shown consists of a base or socket member 42, a shade 43, and a suitable lighting element which may be an incandescent bulb or the like, not shown. A suitable conductor such as the cord 44 leads from the lamp base 32 to any appropriate source of current such as a wall plug or a plug on the machine to which the lighting fixture is to be attached.

All the movable connections, either hinged or swivelled, mentioned above are provided with suitable frictional means so that all elements of the support will remain in adjusted positions. If desired, spring elements analogous to the compression springs 22 and 27 may be provided at other pivotal connections where required. In order to guard the springs 22 and 27 and the associated elements such as the cotter pins, castellated nuts and the like, suitable caps 45 and 46 are provided. These may be secured in any appropriate manner as by pressing them into frictional engagement with elements carried by the plate or bar 20 or bracket 25. These caps should be mounted so as to be removable thus affording access to the adjustable nuts 23 and 28.

As shown in Figs. 1 and 4, the lamp structure just described may be adjusted or tilted or rotated about the swivel 33 to any desired angle and the effective length of the supporting arm may be varied widely by doubling the arm 35 back over the plate or arm 20 or swinging the bracket 25 to various angular positions with respect to the supporting plate 20. The simple rigid construction of the supporting bracket and the column 17 make it particularly well adapted for mounting on machine tool bases where space is usually at a premium and where every service demands that supports be firm and dependable. At the same time the structure described is versatile, capable of application to a wide variety of uses, and is universally adjustable to provide illumination at numerous points as is frequently required in machine shop practice.

Figure 2:
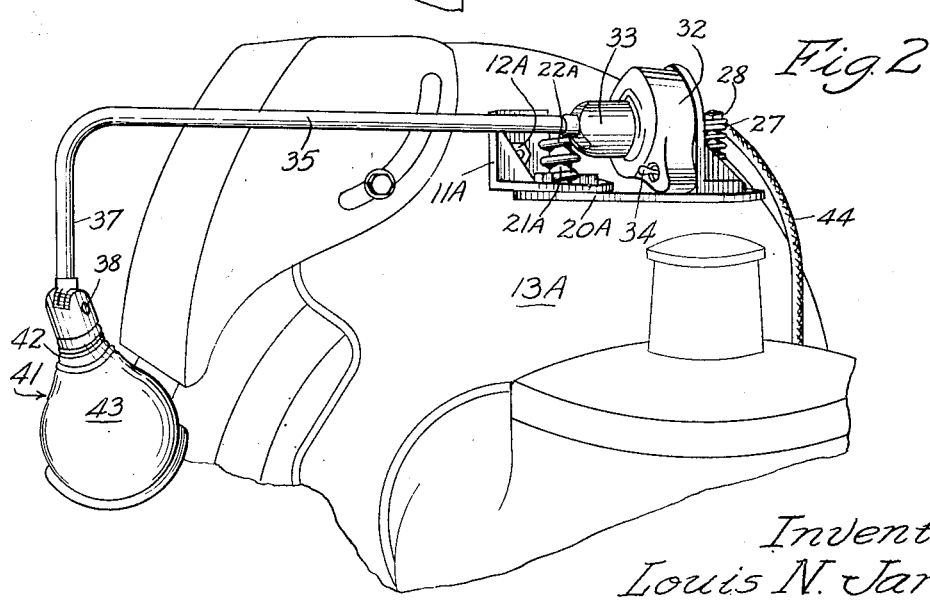
Fig. 2 is a perspective view of a modified form of lamp supporting structure adjusted to a different angle and attached to another type of machine.

Fig. 2 shows a modified form of my invention wherein a lamp supporting structure is attached to a base 13A of another type of machine. In this modification the vertical shaft or column 17 is eliminated, the plate 20A, corresponding to the plate 20 of Fig. 1, being mounted directly on a supporting bracket 11A which may be secured directly to the machine base by suitable means such as bolts 12A. A vertical stud 21A is in this instance secured to or integral with the plate or arm 20A and projects upwardly through an opening in a horizontal flange of the supporting bracket 11A. A suitable compression spring 22A similar to the spring 22 of Fig. 1 may be employed to set up appropriate friction between the plate 20A and the horizontal flange of the bracket. An adjustable nut not shown is provided to place the spring 22A under tension.

The opposite end of the plate 20A supports a bracket 25 identical with that shown in Fig. 1 and the lamp structure carried by such bracket is the same as that shown in Fig. 1.

In Fig. 3 another form of my invention is disclosed which is substantially identical with that shown in Figs. 1 and 4 except that the vertical post or column 17A is much shorter than the post 17 of the embodiment previously described. Obviously, this element may be made of any desired length depending upon the use to which the lamp supporting structure is to be put. In this instance the structure is attached to the base of a planer and the lamp can be adjusted to various angles as required for illumination of work or for adjustment, repair, etc. of the machine itself.

In Fig. 4 the lamp supporting structure of Fig. 1 is shown in another position where it would commonly be used for illuminating the work being done by a grinding machine. Obviously the lamp 41 can be turned to any desired angle and may be moved transversely and raised or lowered as desired.

By means of the construction described above the lamp supporting structure of my invention is markedly superior to certain structures of the prior art. The swinging plate 20 affords a wide range of longitudinal or lateral adjustments and is markedly superior in rigidity to the lazy tong extension construction which has been used for many purposes in the past. The frictional retaining means by which the parts are held in adjusted positions make this a very satisfactory horizontal adjustment for use in connection with vibrating machinery. Thus my invention combines lateral adjustment features with features of vertical and angular adjustment in a novel manner that is applicable to a wide range of uses.

Although I have described my invention in connection with certain types of machine shop tools, it will be understood that its uses are not by any means limited and it can be used in numerous ways and for a wide variety of purposes.

Thus while I have illustrated and described the preferred embodiments of my invention, it is to be understood that these are capable of variation and modification and I therefore do not wish to be limited to the precise details set forth, but desire to avail myself of such changes and alterations as fall within the purview of the following claim.

I claim:

In a support for mounting a lamp in association on a machine tool frame for lighting the working position on such machine, said support comprising a main bracket adapted to be secured in a rigid projecting position on a machine frame, a column extending rigidly at right angles from said bracket and having a reduced pivot and bearing portion, a flat plate-like element disposed on said reduced pivot and bearing portion, an elongated and relatively wide and flat plate-like arm member having pivot openings through opposite end portions thereof, one of said end portions being disposed in flat bearing contact with the plate-like element with said pivot and bearing portion extended through said opening in said one end of said arm member, a spring associated with said pivot and bearing portion and acting to hold the opposed flat surfaces of said arm and said flat plate-like element firmly together in frictional contact, an angle bracket having first and second plate-like flanges, the first of which is adapted to have a lamp secured thereto, the second of said flanges being disposed in flat surface contact with said plate-like arm opposite the other of said pivot openings, a second pivot extended through said second plate-like flange and said other pivot opening, and spring means associated with said second pivot and holding said second flange in flat surface contact with said plate-like arm.

LOUIS N. JARRY.

REFERENCES CITED

The following references are of record in the file of this patent:

UNITED STATES PATENTS

| Number | Name | Date |
| --- | --- | --- |
| 743,270 | Golcher | Nov. 3, 1903 |
| 1,403,863 | Peat | Jan. 17, 1922 |
| 1,714,003 | Deach | May 21, 1929 |
| 1,812,744 | Glenn | June 30, 1931 |
| 2,358,844 | Woodward | Sept. 26, 1944 |